(12) United States Patent
Light-Holets et al.

(10) Patent No.: US 12,434,684 B2
(45) Date of Patent: Oct. 7, 2025

(54) VEHICLE TO VEHICLE COMMUNICATION

(71) Applicant: Cummins Inc., Columbus, IN (US)

(72) Inventors: Jennifer Kay Light-Holets, Greenwood, IN (US); Arun Prakash Thunga Gopal, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/667,918

(22) Filed: May 17, 2024

(65) Prior Publication Data

US 2024/0300473 A1 Sep. 12, 2024

Related U.S. Application Data

(63) Continuation of application No. 17/041,903, filed as application No. PCT/US2018/025439 on Mar. 30, 2018, now abandoned.

(51) Int. Cl.
*B60W 20/13* (2016.01)
*B60L 15/20* (2006.01)
(Continued)

(52) U.S. Cl.
CPC .............. *B60W 20/13* (2016.01); *B60L 15/20* (2013.01); *B60L 53/305* (2019.02); *B60L 53/66* (2019.02);
(Continued)

(58) Field of Classification Search
None
See application file for complete search history.

(56) References Cited

U.S. PATENT DOCUMENTS 8,970,341 B2 3/2015 Park et al.
9,026,357 B2 5/2015 Park et al.
(Continued)

FOREIGN PATENT DOCUMENTS

CN 104160433 A 11/2014
CN 103116983 1/2015
(Continued)

OTHER PUBLICATIONS

CN First Office Action and Search Report for Application No. 201880092169.0 mailing date Mar. 9, 2023, 21 pages with English Translation.
(Continued)

*Primary Examiner* — Navid Z. Mehdizadeh
*Assistant Examiner* — Jason R Roberson
(74) *Attorney, Agent, or Firm* — Foley & Lardner LLP

(57) ABSTRACT

The system disclosed herein is for communication between a first electric vehicle and a second electric vehicle following the first electric vehicle on a route. The system includes a controller communicatively coupled to a battery associated with the second electric vehicle. The controller is configured to acquire a set of operating parameters associated with the first electric vehicle from the first electric vehicle and generate an adjustment command configured to adjust a component operating parameter of at least one component of the second electric vehicle based on the set of operating parameters. The set of operating parameters includes charge station data indicating whether a charge station along the route is unavailable for use.

19 Claims, 5 Drawing Sheets

(51) Int. Cl.
    *B60L 53/30*     (2019.01)
    *B60L 53/66*     (2019.01)
    *B60L 58/12*     (2019.01)
    *B60W 10/06*     (2006.01)
    *B60W 10/08*     (2006.01)

(52) U.S. Cl.
    CPC ............. *B60L 58/12* (2019.02); *B60W 10/06* (2013.01); *B60W 10/08* (2013.01); *B60W 2710/0677* (2013.01); *B60W 2710/083* (2013.01); *B60W 2754/00* (2020.02); *B60W 2756/10* (2020.02); *B60Y 2200/91* (2013.01); *B60Y 2200/92* (2013.01)

(56) References Cited

U.S. PATENT DOCUMENTS

| | | |
|---|---|---|
| 9,321,366 B1 | 4/2016 | Simonini et al. |
| 9,446,672 B2 | 9/2016 | Hill et al. |
| 2006/0293841 A1 | 12/2006 | Hrovat et al. |
| 2009/0143188 A1 | 6/2009 | Soliman et al. |
| 2010/0112595 A1 | 5/2010 | Liu et al. |
| 2012/0197693 A1 | 8/2012 | Karner et al. |
| 2013/0079964 A1 | 3/2013 | Sukkarie et al. |
| 2013/0127416 A1 | 5/2013 | Karner et al. |
| 2015/0226567 A1* | 8/2015 | North .................. B60L 53/30 701/533 |
| 2015/0296411 A1 | 10/2015 | Meyer et al. |
| 2016/0104486 A1* | 4/2016 | Penilla ............... G10L 25/45 704/232 |
| 2017/0039783 A1 | 2/2017 | Hobel |
| 2017/0069144 A1 | 3/2017 | Lawrie-Fussey et al. |
| 2017/0282744 A1* | 10/2017 | Koo ................. B60W 30/1886 |
| 2018/0162359 A1 | 6/2018 | Perkins |
| 2018/0281612 A1* | 10/2018 | Perry .................. H04W 4/80 |
| 2020/0164859 A1* | 5/2020 | Books ............... B60W 10/06 |

FOREIGN PATENT DOCUMENTS

| | | |
|---|---|---|
| CN | 107241680 A | 10/2017 |
| DE | 10 2016 003 450 A1 | 10/2016 |
| KR | 101475061 | 12/2014 |
| KR | 20150000746 A | 1/2015 |
| WO | WO-2010/003440 A1 | 1/2010 |

OTHER PUBLICATIONS

Final Office Action on U.S. Appl. No. 17/041,903 DTD Dec. 18, 2023.

Foreign Action other than Search Report on CN DTD Sep. 27, 2023.

International Search Report and Written Opinion for International Application No. PCT/US2018/025439, mail date Jun. 26, 2018, 8 pages.

Non-Final Office Action on U.S. Appl. No. 17/041,903 DTD Jun. 7, 2023.

* cited by examiner

VEHICLE TO VEHICLE COMMUNICATION

CROSS-REFERENCE TO RELATED PATENT APPLICATIONS

This application is a continuation of U.S. patent application Ser. No. 17/041,903, filed Sep. 25, 2020, which is a national phase of International Patent Application No. PCT/2018/025439, filed Mar. 30, 2018, both of which are incorporated herein by reference in their entireties.

TECHNICAL FIELD

The present application relates generally to vehicle management systems for managing vehicle to vehicle communications.

BACKGROUND

Vehicles, such as a bus, generally carry passengers along a route. In some instances, multiple buses may be running the same route and stopping at various locations along the route to adhere to a posted schedule. With respect to a bus, as the bus travels along the route, the bus may pick up and drop off N number of passengers requiring the bus to operate at various loads. In some instances, the bus may encounter traffic while running the route and may be delayed for a variable period of time. In these situations, the engine or the battery may be continuously operated to keep the bus traveling along the route, thereby, inefficiently consuming fuel or the energy stored in the battery.

SUMMARY

Embodiments described herein relate generally to systems and methods for vehicle to vehicle communication and, in particular, to systems and methods for determining a set of first operating parameters of a first electric vehicle traveling on a route and adjusting at least one component operating parameter of a second electric vehicle following the first electric vehicle on the route based on the set of first operating parameters, so as to manage a state of charge of a battery of the second electric vehicle.

In a set of embodiments, a system for communication between a first electric vehicle and a second electric vehicle following the first electric vehicle on a route comprises a controller communicatively coupled to a battery associated with the second electric vehicle. The controller is configured to receive a set of first operating parameters associated with the first electric vehicle. The controller is configured to determine whether to adjust a component operating parameter of at least one component of the second electric vehicle based on the set of first operating parameters. The controller is configured to generate an adjustment command configured to adjust a component operating parameter of the at least one component responsive to the determination. The adjustment of the component operating parameter is configured to manage a state of charge of the battery associated with the second electric vehicle.

In another set of embodiments, a controller is configured to be coupled to a battery of a second electric vehicle which follows a first electric vehicle on a route. The controller is configured to receive a set of first operating parameters associated with the first electric vehicle. The controller is configured to determine whether to adjust a component operating parameter of at least one component of the second electric vehicle based on the set of first operating parameters. The controller is further configured to generate an adjustment command configured to adjust a component operating parameter of the at least one component responsive to the determination. The adjustment of the component operating parameter is configured to manage a state of charge of a battery associated with the second electric vehicle.

In yet another set of embodiments, a method comprises receiving a set of first operating parameters associated with a first electric vehicle. It is determined whether to adjust a component operating parameter of at least one component of a second electric vehicle based on the set of first operating parameters. The second electric vehicle follows the first electric vehicle on a route. An adjustment command is generated which is configured to adjust a component operating parameter of the at least one component responsive to the determination. The adjustment of the component operating parameter is configured to manage a state of charge of the battery associated with the second electric vehicle.

In still another set of embodiments, a method comprises determining a set of first operating parameters associated with a first electric vehicle traveling on a route. A second electric vehicle, which follows the first electric vehicle on the route, receives the set of first operating parameters. A set of second operating parameters are estimated based on the set of first operating parameters. A component operating parameter of at least one component of the second electric vehicle is adjusted based on the set of second operating parameters.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
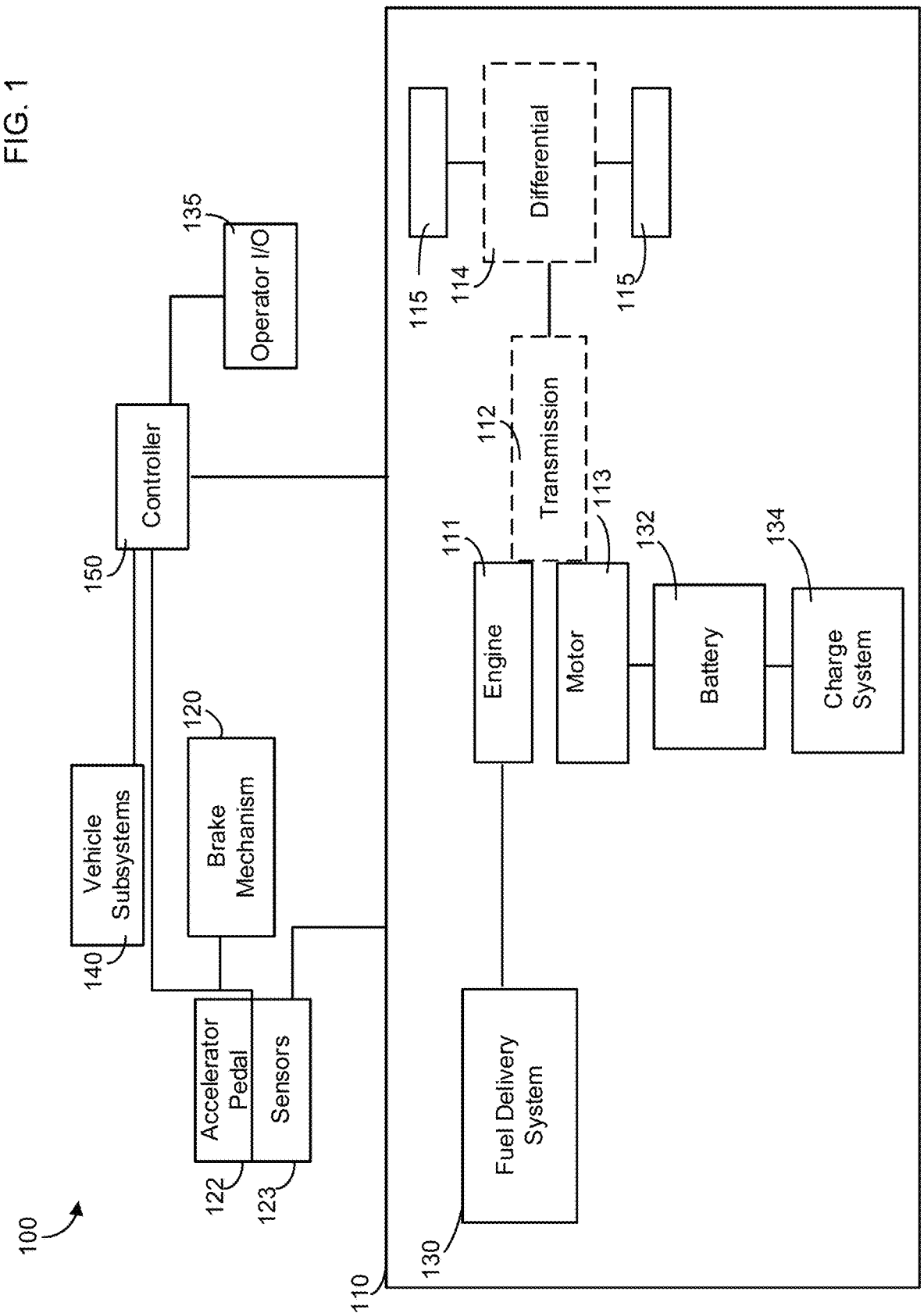
FIG. 1 is a schematic block diagram of a vehicle and various components and systems included therein, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for vehicle to vehicle communication and, in particular, to systems and methods for determining a set of first operating parameters of a first electric vehicle traveling on a route and adjusting at least one component operating parameter of a second electric vehicle following the first electric vehicle on the route based on the set of first operating parameters, so as to manage a state of charge of a battery of the second electric vehicle.

Vehicles such as a bus generally carry passengers along a predefined route. These situations may be encountered by public transportation electric vehicles, such as school buses, trains, subways, and shuttle buses. For example, electric school buses may run a route one or more times in the morning (e.g., run three different routes in the morning to pick up elementary, middle and high school children, respectively) with slightly different end points, and reverse the routes in the evening. Electric vehicles used as taxis may also travel a similar route in certain situations (e.g., transporting a series of passengers to or from an airport, a sporting event, a concert, a hotel, etc.). Similarly, various electric garbage trucks may run the same route at different times of the day. For example, a trash truck may run first on the route, followed by a recycling truck, and then a compost truck (e.g., collecting yard waste). In each of these scenarios, one or more parameters encountered by the leading electric vehicle on the route are not available to the following vehicle. Therefore, the following electric vehicle reactively adjusts component operating parameters of one or more components included in the following electric vehicle as it travels along the route.

Various embodiments of the systems, apparatuses, and methods described herein may provide benefits including, for example: (1) providing vehicle to vehicle communication between a first electric vehicle, and a second electric vehicle following the first electric vehicle on a route so as to inform the second electric vehicle of operating parameters of the first electric vehicle which are indicative of the operating parameters which will be encountered by the second electric vehicle; (2) proactively adjusting various component operating parameters of the second electric vehicle based on the operating parameters of the first electric vehicle; and (3) allowing proactive managing of state of charge of a battery of the second electric vehicle by load balancing between battery and engine of the second electric vehicle, thereby reducing battery consumption and increasing range of the second electric vehicle.

FIG. 1 depicts a schematic block diagram of an example first electric vehicle 100, according to an example embodiment. The first electric vehicle 100 may comprise a hybrid electric vehicle (HEV), a plug-in hybrid electric vehicle (PHEV), a range-extended electric vehicle (REEV), an extended-range electric vehicle (E-REV), a range-extended battery-electric vehicle (BEVx), or any other vehicle powered by or otherwise operable via a combination of a battery, generator (e.g., a power generator, generator plant, electric power strip, on-board rechargeable electricity storage system, etc.), an engine, a motor (e.g., an electric motor, traction motor, motor-generator unit, etc.), etc. The first electric vehicle 100 may be operable in series (e.g., utilizing a single path that powers the wheels of the first electric vehicle 100 and a plurality of energy sources) or in parallel (e.g., utilizing an engine path and an electrical path to power the wheels of the first electric vehicle 100). The first electric vehicle 100 may be an on-road or off-road vehicle including, but not limited to, a bus, hotel shuttle, taxi, car, truck, train, garbage truck, van, or any other type of driver and/or passenger vehicle. In the example shown, the first electric vehicle 100 is a PHEV.

Figure 2:
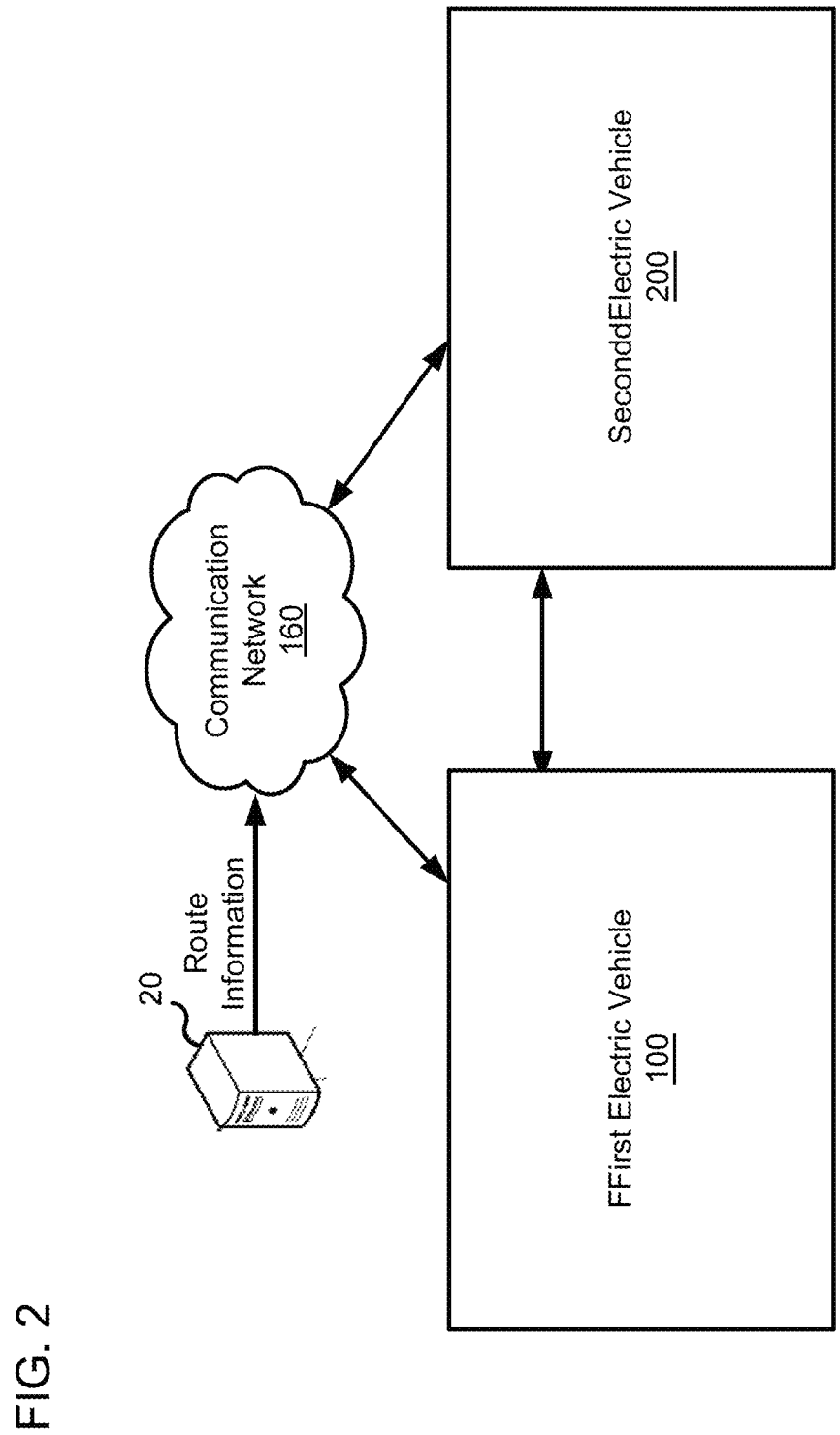
FIG. 2 is a schematic block diagram of a vehicle management system 10 including a first electric vehicle in communication with a second electric vehicle which follows the first electric vehicle on a route, according to another embodiment.

FIG. 2 shows a vehicle management system 10 including the first electric vehicle 100 traveling on a route (e.g., a passenger bus traveling on a known route), and a second electric vehicle 200. The second electric vehicle 200 follows the first electric vehicle 100 (e.g., is scheduled to follow the first electric vehicle 100 on the route after a predetermined scheduled time). The second electric vehicle 200 may be substantially similar to the first electric vehicle 100 and include the same components as described with respect to FIG. 1. The second electric vehicle 200 may be in communication with the first electric vehicle 100 via a communication network 160, as described in further detail herein. In particular embodiments, the communication network 160 may also be communicatively coupled to an external notification system 20, for example a map system (e.g., GOOGLE MAPS®, APPLE MAPS, WAZE®, etc.), a news service (e.g., CNN®, FOX®, ABC®, CBS®, etc.), a weather reporting system (e.g., the WEATHER CHANNEL®, local or global weather reporting services, etc.), or any combination thereof via the communication network 160. The external notification system 20 may provide route information, for example, traffic, blockages, detours, status of charging stations, etc. which may be used by the vehicle to vehicle management system 10 to optimize the efficiency of the second electric vehicle 200 and/or the first electric vehicle 100.

Referring to FIGS. 1-2, the first electric vehicle 100 and/or the second electric vehicle 200 may include one or more vehicle components. The vehicle components may include, but are not limited to, an engine 111 (e.g., an internal combustion engine, diesel engine, gasoline engine, natural gas engine, alcohol engine, dual-fuel engine, etc.), a motor 113 (e.g., a DC motor), a fuel delivery system 130, a battery 132 (e.g., a li-ion battery, a li-sulfur battery, a super capacitor, etc.), a charge system 134, a heating, ventilation and air conditioning (HVAC) system, a geolocation system, or an aftertreatment device/system. Accordingly, the depiction and description of the electric vehicles 100, 200 contained herein is not meant to be limiting as other types of electric vehicles and/or vehicle components may be associated with or otherwise used with the vehicle management system 10. In some embodiments, the battery 132 may comprise a 12V battery such as those used on HEVs or PHEVs.

In other embodiments, the battery 132 may comprise a mild voltage battery (e.g., a 24V or a 48V battery) such as those used in PHEVs, or a high voltage battery (e.g., a 700 V battery) such as those used in BEVs or REEVs. In particular embodiments, as shown in FIG. 1, the first electric vehicle 100 and/or the second electric vehicle 200 may also comprise a low voltage battery 131 in addition to the battery 132. The low voltage battery 131 may comprise, for example, a 12V, a 24V, or a 48V battery operably coupled to the battery 132 via a DC/DC convertor 133. In other embodiments, a different battery voltage may be utilized. In such embodiments, the battery 132 may comprise a high voltage battery (e.g., a 700 V battery). The low voltage battery 131 may serve as an auxiliary power source, for example, to provide electrical power to auxiliary systems or provide electrical charge to the battery 132 (e.g., a main battery of a BEV or a REEV).

The first electric vehicle 100 is shown to generally include a controller 150 communicably and operatively coupled to a brake mechanism 120 (e.g., a brake, braking system, or any other device configured to prevent or reduce motion by slowing or stopping components (e.g., a wheel, axle, pedal, etc. of a vehicle), an accelerator pedal 122, a powertrain system 110, an operator input/output (I/O) device 135, and one or more additional vehicle subsystems 140. It should be understood that the first electric vehicle 100 and/or the second electric vehicle 200 may include additional, less, and/or different components/systems than depicted in FIG. 1, such that the principles, methods, systems, apparatuses, processes, and the like of the present disclosure are intended to be applicable with any other vehicle configuration. It should also be understood that the principles of the present disclosure should not be interpreted to be limited to on-highway vehicles; rather, the present disclosure contemplates that the principles may also be applied to a variety of other applications including, but not limited to, off-highway construction equipment, mining equipment, marine equipment, locomotive equipment, etc.

The powertrain system 110 facilitates power transfer from the motor 113 and/or the battery 132 to power the first electric vehicle 100. In an example embodiment, the first electric vehicle 100 (e.g., a series hybrid electric vehicle) may be operable via a powertrain system 110 which includes a motor 113 operably coupled to a battery 132 and charge system 134, where the motor 113 transfers power to the final drive 115 (shown as wheels 115) to propel the first electric vehicle 100. As shown in FIG. 1, the powertrain system 110 includes various components that may be included in a hybrid electric vehicle, such as for example, an engine 111 operably coupled to a transmission 112, a motor 113, and a differential 114, where the differential 114 transfers power output from the engine 111 to the final drive 115 (shown as wheels 115) to propel the first electric vehicle 100.

The controller 150 of the first electric vehicle 100 (e.g., a hybrid electric vehicle) may command or control the battery 132 to provide electricity to the motor 113 (e.g., an electric motor) in response to input received by the controller 150 from the accelerator pedal 122, the charge system 134 (e.g., a battery charging system, rechargeable battery, etc.), etc. The battery 132 may be structured to receive a rapid charge. In some embodiments, the electricity provided to power the motor 113 may be provided by the engine 111, for example, an onboard gasoline-engine generator, a hydrogen fuel cell, etc. For example, the first electric vehicle 100 may include a hybrid electric vehicle in which the power to drive the motor 113 is intermittently provided by the battery 132, and engine 111 (e.g., via an alternator or generator coupled to the engine 111 and the motor 113). In other embodiments, the first electric vehicle 100 may include a REEV in which the power is primarily provided to the motor 113 by the battery 132, and the engine 111 provided power to the motor 113 once a battery charge of the battery 132 drops below a predetermined charge threshold.

In some embodiments, the engine 111 may include an internal combustion engine that receives a chemical energy input (e.g., a fuel such as natural gas, gasoline, ethanol, methanol, diesel, bio-diesel, or a combination thereof) from the fuel delivery system 130 (e.g., a fuel injector), and combusts the fuel to generate mechanical energy, in the form of a rotating crankshaft. The transmission 112 may be coupled to the crankshaft and manipulates the speed of the crankshaft (e.g., the engine speed, which is usually expressed in revolutions-per-minute (RPM)) to effect a desired drive shaft speed. A rotating drive shaft may be received by a differential 114, which provides the rotation energy from the drive shaft to the final drive 115. The final drive 115 may then propel or move the first electric vehicle 100. Further, the drive shaft may be structured as a one-piece, two-piece, and/or a slip-in-tube driveshaft based on the application. In particular embodiments, the motor 113 (e.g., a plurality of DC motors) may be coupled to each of the wheels 115 and provide linear acceleration to the wheels 115 based on power drawn from the battery 132, such that the transmission 112 and/or differential 114 may be excluded from the first electric vehicle 100.

In some embodiments, the first electric vehicle 100 may include the transmission 112. The transmission 112 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission 112 can include a variety of settings (e.g., gears, for a geared transmission) that affect different output speeds based on the engine speed. Like the engine 111, the transmission 112, motor 113, differential 114, and final drive 115 may be structured in any configuration dependent on the application (e.g., the final drive 115 may be structured as wheels in an automotive application and a propeller in an airplane application).

The first electric vehicle 100 may include a throttle system (e.g., a throttle system including an intake manifold throttle) depending on the engine system utilized. The throttle system generally includes a throttle valve (e.g., a ball valve, a butterfly valve, a globe valve, or a plug valve), which in certain embodiments is operatively and communicably coupled to an accelerator pedal 122 and/or one or more sensors 123. The throttle valve is structured to selectively control the amount of intake air provided to the engine 111. Because the type of engine 111 may vary from application-to-application, the type of throttle valve may also vary with all such possibilities and configurations falling within the spirit and scope of the present disclosure. The term "throttle system" as used herein should be understood broadly, and may refer to any air management system, including without limitation an intake throttle, an exhaust throttle, and/or manipulations of an air handling device such as a turbocharger (e.g., a wastegate turbocharger and/or a variable geometry turbocharger). The throttle system may additionally or alternatively be active during stoichiometric-like operations of the engine 111, and inactive or less active during lean burn-like operations of the engine 111.

The accelerator pedal 122 may be structured as any type of torque and/or speed request device included with a system (e.g., a floor-based pedal, an acceleration lever, etc.). Furthermore, the sensors 123 may include any type of sensors included with the brake mechanism 120, accelerator pedal 122, or any other component and/or system included in the powertrain system 110 of a vehicle. For example, the sensors 123 may include a fuel temperature sensor, a charge air temperature sensor, a coolant temperature and pressure sensor, an ambient air temperature and pressure sensor, a fuel pressure sensor, an injection pump speed sensor, and the like. The sensors 123 may additionally or alternatively include a geolocation sensor structured to determine a geolocation of each of the first electric vehicle 100. The sensors 123 may additionally or alternatively include a speed sensor structured to facilitate monitoring the speed of the first electric vehicle 100. The sensors 123 may additionally or alternatively include road grade monitoring, traffic monitoring, charge station status monitoring and/or weather monitoring sensor, and/or visual sensors such as gray scale, color or infrared cameras.

As depicted in FIG. 1, the first electric vehicle 100 includes the operator I/O device 135. The operator I/O device 135 enables an operator of the vehicle to communicate with the first electric vehicle 100 and the controller 150. Analogously, the I/O device 135 enables the vehicle or controller 150 to communicate with the operator. For example, the operator I/O device 135 may include, but is not limited, an interactive display (e.g., a touchscreen, etc.) having one or more buttons/input devices, haptic feedback devices, a shifter for the transmission 112, a cruise control input setting, a navigation input setting, etc. Via the I/O device 135, the controller 150 may also provide commands/instructions/information to the operator (or a passenger).

As also shown in FIG. 1, the first electric vehicle 100 includes one or more vehicle subsystems 140. The various vehicle subsystems 140 may generally include one or more sensors (e.g., a speed sensor, torque sensor, ambient pressure sensor, temperature sensor, etc.), HVAC system, as well as any subsystem that may be included with a vehicle. Accordingly, in some embodiments including a hybrid electric vehicle, the vehicle subsystems 140 may also include an exhaust aftertreatment system structured to reduce diesel exhaust emissions, such as a selective catalytic reduction (SCR) catalyst, a diesel oxidation catalyst (DOC), a diesel particulate filter (DPF), a diesel exhaust fluid doser with a supply of diesel exhaust fluid, and a plurality of sensors for monitoring the exhaust aftertreatment system (e.g., a NOx sensor). In various embodiments, the vehicle subsystems 140 may include one or more electrically-powered accessories and/or engine-drive accessories. Electrically-powered accessories may receive power from an energy storage device included in the first electric vehicle 100 and/or the second electric vehicle 200 to facilitate operation thereof. Being electrically-powered, the accessories may be able to be driven largely independent of the engine 111 of the first electric vehicle 100 (e.g., not driven off of a belt coupled to the engine 111). The electrically-powered accessories may include, but are not limited to, air compressors (e.g., pneumatic devices, etc.), air conditioning systems, heating systems, power steering pumps, engine coolant pumps, fans, and/or any other electrically-powered vehicle accessories.

In particular embodiments, the vehicle subsystem 140 may also include a geolocation system (e.g., a global positioning system, (GPS)) or tracking system configured to determine and indicate a geolocation of the first electric vehicle 100 (e.g., the location of the first electric vehicle 100 on the route). The controller 150 (e.g., an electronic control system) may be communicatively coupled to the geolocation system. The geolocation system may be structured as any type of tracking system to track (e.g., according to latitude and longitude data, elevation data, etc.) the location of the first electric vehicle 100 or component, one or more memory devices for storing, transmitting, or receiving tracked data, or any other data associated with the first electric vehicle 100, one or more electronic processing units for processing data, and/or a communication interface for facilitating the exchange of data between the geolocation system and the controller 150. In this regard, the communication interface may be structured as any type of communication interface or protocol including, but not limited to, Wi-Fi, WiMax, Internet, Radio, Bluetooth®, Zigbee, satellite, radio, cellular, GSM, GPRS, LTE, etc. such that the geolocation system may be structured to operate wirelessly via over air transfer, a wireless chip, wireless circuit, wireless communication network, or combination thereof as described herein.

The controller 150 is communicably and operatively coupled to the powertrain system 110, brake mechanism 120, accelerator pedal 122, the operator I/O device 135, and the one or more vehicle subsystems 140. Communication between and among the components may be via any number of wired or wireless connections (e.g., any standard under IEEE 802, etc.). For example, a wired connection may include a serial cable, a fiber optic cable, an SAE J1939 bus, a CAT5 cable, or any other form of wired connection. In some embodiments, a wireless connection may include the Internet, Wi-Fi, Bluetooth, Zigbee, cellular, radio, etc. In particular embodiments, a controller area network (CAN) bus including any number of wired and wireless connections provide the exchange of signals, information, and/or data. Because the controller 150 is communicably coupled to the systems and components in the first electric vehicle 100 of FIG. 1, the controller 150 is structured to receive data (e.g., instructions, commands, signals, values, etc.) from one or more of the components shown in FIG. 1. It should be understood that the first electric vehicle 100 and/or the second electric vehicle 200 may include additional, less, and/or different components/systems than depicted in FIG. 1, such that the principles, methods, systems, apparatuses, processes, and the like of the present disclosure are intended to be applicable with the vehicle management system 10.

Example and non-limiting circuit implementation elements of the controller 150 include sensors (e.g., the sensors 123) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

Figure 4:
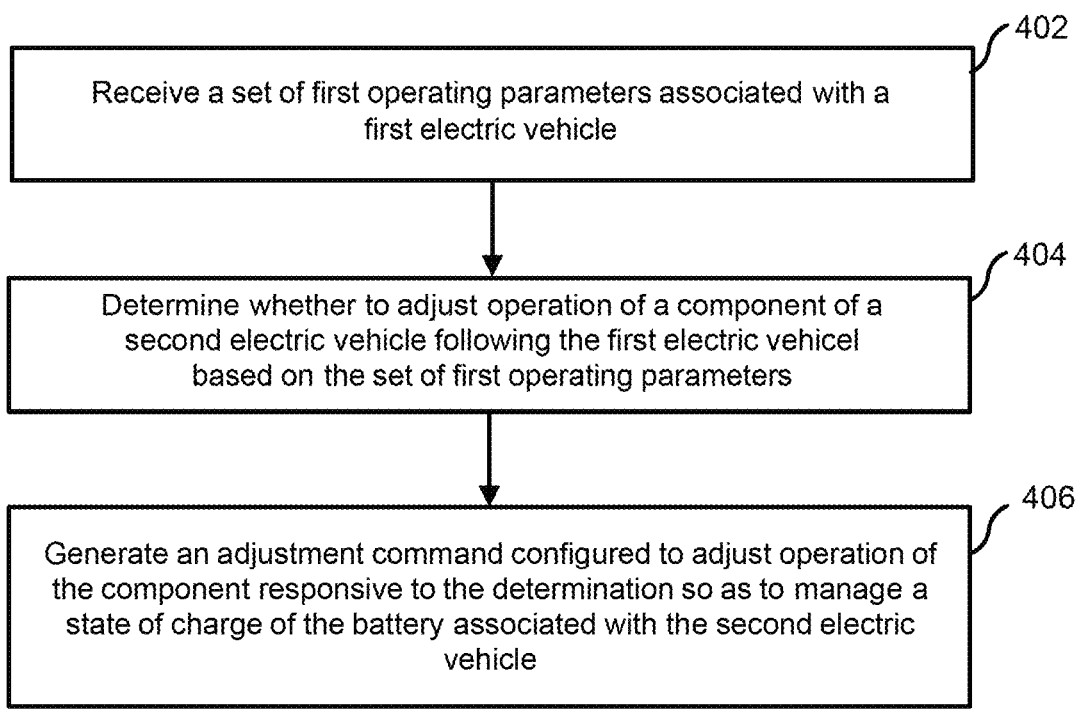
FIG. 4 is a schematic flow diagram of a method of managing a state of charge of a battery included in a second electric vehicle which follows a first electric vehicle on a route, according to an embodiment.
Figure 5:
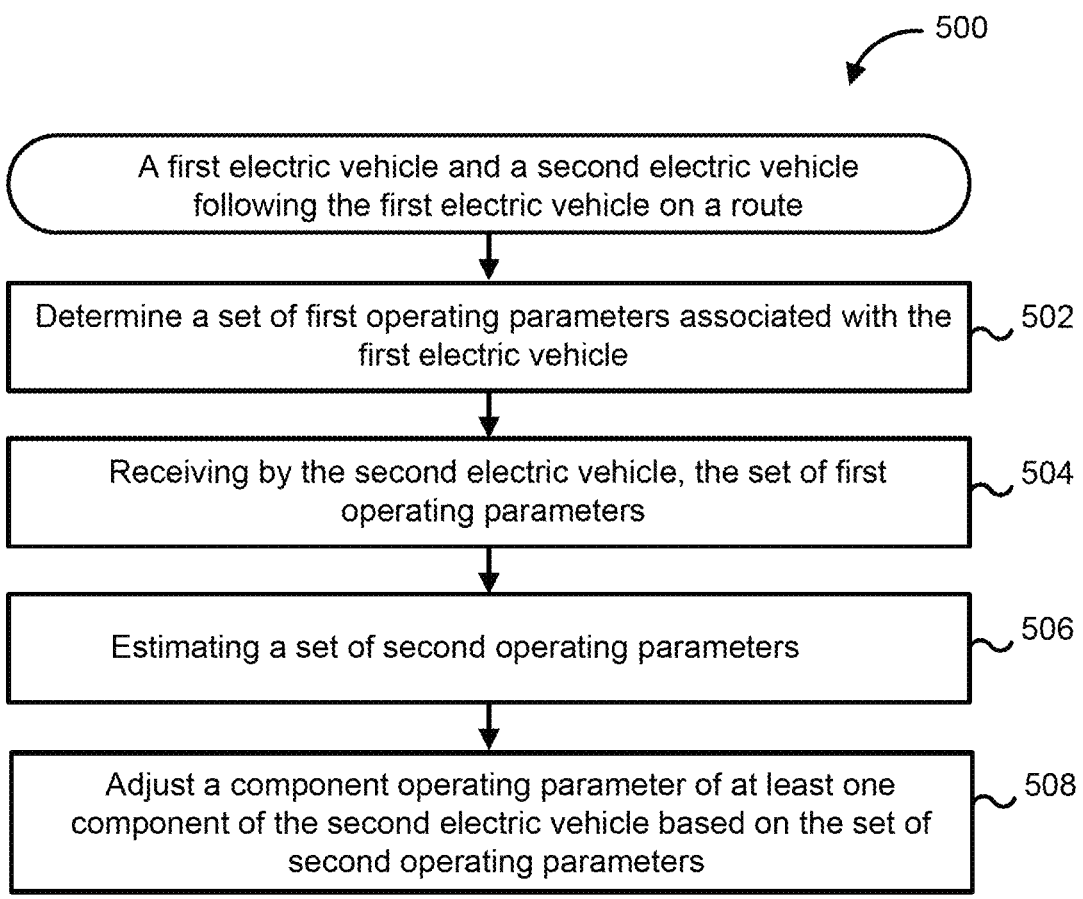
FIG. 5 is a schematic flow diagram of a method of managing component operating parameters of at least one component of a second electric vehicle which follows a first electric vehicle on a route, according to another embodiment.

The controller 150 may be structured to perform certain operations such as those described herein in relation to FIGS. 4 and 5. In certain embodiments, the controller 150 forms a portion of a processing subsystem including one or more computing devices having memory, processing, and communication hardware. The controller 150 may include a microprocessor, an application-specific integrated circuit (ASIC), a field-programmable gate array (FPGA), etc., or combinations thereof. The controller 150 may include memory which may include, but is not limited to, electronic, optical, magnetic, or any other storage or transmission device capable of providing a processor, ASIC, FPGA, etc. with program instructions. The memory may include a memory chip, electrically erasable programmable read-only memory (EEPROM), erasable programmable read only memory (EPROM), flash memory, or any other suitable memory from which the controller 150 can read instructions. The instructions may include code from any suitable programming language. The controller 150 may be a single device or a distributed device, and the functions of the controller 150 may be performed by hardware and/or as computer instructions on a non-transient computer readable storage medium.

The controller 150 is also structured to receive, acquire, and/or interpret data from one or more components in or otherwise associated with the first electric vehicle 100 (e.g., a PHEV bus or other vehicle). As such, the controller 150 may be communicably coupled to one or more sensors corresponding to the component. For example, the controller 150 may receive engine speed and engine torque data from each of an engine speed sensor and an engine torque sensor, respectively. For tracking, compartmentalization, and analytics, each piece of data may correspond to a data identifier (DIDs) (e.g., a code, value, etc.). The controller 150 may also receive data from an on-board diagnostics system (e.g., OBD II, OBD I, EOBD, JOBD, etc.). As such, the controller 150 may receive diagnostic trouble codes (DTCs) based on one or more operating characteristics of a component in the first electric vehicle 100. The DTCs may include fault codes, parameter IDs, etc.

As shown in FIG. 2, the first electric vehicle 100 travels on a route, and the second electric vehicle 200 follows the first electric vehicle 100 on the same route, or a slightly different route at a later time. The first electric vehicle 100 and the second electric vehicle 200 may be in communication with each other via the communication network 160. The communication network 160 may include any suitable Local Area Network (LAN) or Wide Area Network (WAN). For example, the communication network 160 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (lx), General Packet Radio Service (GPRS), Personal Communications Service (PCS), 802.11X, ZigBee, Bluetooth, Wi-Fi, any suitable wired network, combination thereof, and/or the like. The communication network 160 is structured to permit the exchange of data, values, instructions, messages, and the like between the controllers 150 of the first electric vehicle 100 and the second electric vehicle 200. In other arrangements, the first electric vehicle 100 and the second electric vehicle 200 may be directly in communication with each other such that the communication network 160 is excluded. For example, the controller 150 of the first electric vehicle 100 may generate signals which are detected by the sensors 123 of the following second electric vehicle 200, and interpreted by the controller 150 of the second electric vehicle 200.

The controller 150 of the second electric vehicle 200 is configured to receive a set of first operating parameters associated with the first electric vehicle 100, from the first electric vehicle 100, for example, via the communication network 160. The set of first operating parameters may include, for example, traffic data, ridership data, charge station data, time of day data, day of week data, time of operation relative to daily mission data, route schedule data, vehicle weight data, ambient conditions data, etc. associated with the first electric vehicle 100.

Expanding further, the first electric vehicle 100 runs ahead of the second electric vehicle 200 on the route and encounters the set of first operating parameters as it proceeds on the route. For example, the first electric vehicle 100 runs on the route at a first time (e.g., in the morning) and the second electric vehicle runs on the same route or substantially the same route after a predetermined time (e.g., after 5 mins, 10 minutes, 15 minutes or in the evening). The sensors 123 or other components included in the first electric vehicle 100 may detect the various operating parameters (e.g., sensors 123 and/or geolocation system determines traffic information, state of charge of the battery 132, battery 132 usage versus engine 111 usage, machine vision or communication system detect status of charging stations on the route, number of passengers riding on the first electric vehicle 100, weight of the first electric vehicle 100, heat load, etc.).

While vehicle management system 10 shows, the first electric vehicle 100 and the second electric vehicle 200, the vehicle management system 10 may include any number of electric vehicles traveling on the route The electric vehicles 100, 200 may operate according to a fixed route or a non-fixed route. The controller 150 of the first electric vehicle 100 (e.g., a first PHEV bus) may be configured to determine the set of first operating parameters (e.g., traffic data, ridership data, charge station data), and transmit the set of first operating parameters to the controller 150 of the second electric vehicle (e.g., via the communication network 160). Alternatively or additionally, the one or more parameters (e.g., traffic data, charge station data, etc.) associated with the first electric vehicle 100 may be transmitted to the geolocation system (e.g., a telematics system, GPS, location positioning system, etc.) associated with the second electric vehicle 200 (e.g., a second PHEV bus). In various embodiments, the controller 150 of the first electric vehicle 100 may be configured to transmit the set of first operating parameters to a plurality of electric vehicles (e.g., a plurality of PHEV vehicles included in a fleet traveling on the route at various time frames after the first electric vehicle 100).

The charge station data may include a current charge station status, a previous charge station status, or a combination thereof. The charge station data may be associated with a location of at least one of the first electric vehicle 100 and the second electric vehicle 200. For example, the controller 150 associated with the first electric vehicle 100 (e.g., a departing PHEV bus) may transmit or otherwise communicate the history and/or the status of a charge station along a route to the controller 150 associated with the second electric vehicle 200 (e.g., the next arriving PHEV bus). In some examples, the controller 150 associated with the first electric vehicle 100 (e.g., a departing PHEV bus) may transmit, exchange, or otherwise communicate the status of the traffic (e.g., an increase stop-start event if vehicle is running in load sharing mode between engine 111 and battery 132) at or near a charge station along a route to the controller 150 associated with a second electric vehicle 200 (e.g., the next arriving PHEV bus). The controller 150 of the first electric vehicle 100 running the same route, for example, a few minutes earlier may transmit the one or more parameters in real-time or near real-time such that the first electric vehicle 100 may communicate current data comprising the first operating parameters corresponding to the first electric vehicle 100 to the second electric vehicle 200 (e.g., the next arriving bus) in real-time or near real-time. To that end, the second electric vehicle 200 may receive data from the first electric vehicle 100 (or plurality of electric vehicles may exchange data) such as, but not limited to, current traffic conditions, the number of passengers currently riding the first electric vehicle 100, history of a charge station, status of a charge station, etc. In further examples, the first electric vehicle 100 (e.g., a departing PHEV bus) may transmit, exchange, or otherwise communicate the number of passengers currently riding in the in-bound direction to the second electric vehicle 200 (e.g., the next arriving bus). In other examples, the controller 150 of the first electric vehicle 100 (e.g., one or more inbound PHEV buses) may track the number of passengers transported to a location, an area (e.g., into a city), or other destination before a certain time.

The controller 150 of the second electric vehicle 200 may be configured to determine whether to adjust a component operating parameter of at least one component of the second electric vehicle 200 based on the set of first operating parameters. The controller 150 may generate an adjustment command configured to adjust a component operating parameter of the at least one component (e.g., the engine 111, the battery 132 and/or the motor 113) of the second electric vehicle 200 responsive to the determination. The adjustment of the component operating parameter is configured to manage a state of charge of the battery 132 associated with the second electric vehicle 200.

Expanding further, the first electric vehicle 100, which may be the leading vehicle on the route encounters the set of first operating parameters. The controller 150 of the first electric vehicle 100 responds reactively to the set of first operating parameters, for example, reactively adjusts operating the first electric vehicle 100 on the engine 111, on the battery 132 or a combination thereof. For example, if there is heavy traffic it may be more efficient to run the first electric vehicle 100 on the battery 132 to increase mileage. However, if a charge station ahead on the route is not functioning or is otherwise, inactive, the battery 132 may be drained too much which may result in the first electric vehicle 100 running on the engine 111 for an extended period of time, decreasing range and increasing emissions. Similarly, when ridership is high (e.g., during rush hour), the heat load and weight of the first electric vehicle 100 may increase, leading to an increase draw on the battery 132 by the motor 113 and/or the HVAC system.

The second electric vehicle 200 follows the first electric vehicle 100 on the route (e.g., runs on the same route at a scheduled time after the first electric vehicle 100) and may encounter operating parameters comparable to the set of first operating parameters. The controller 150 of the second electric vehicle 200 receives the set of first operating parameters from the first electric vehicle 100, and may proactively adjust the component operating parameter of at least one component (e.g., the engine 111, the battery 132 and/or the motor 113) of the second electric vehicle 200. This may allow the second electric vehicle 200 to manage the state of charge of the battery 132, for example, optimize operation between the battery 132 and the engine 111, reduce battery consumption and/or increase range.

The set of first operating parameters may include charge station data comprising at least one of a current charge station status and a previous charge station status. The charge station data may be associated with a location of at least one of the first electric vehicle 100 and the second electric vehicle 200. For example, if the set of first operating parameters indicate that a particular charging station on the route is not operational, the controller 150 of the second electric vehicle 200 may generate the adjustment command configured to cause the second electric vehicle 200 to operate more on the engine 111 so as to reduce energy consumption. Similarly, if the set of first operating parameters indicate that heavy traffic may be encountered on the route, the adjustment command may be configured to cause the second electric vehicle 200 to run more on the engine 111 in a low traffic zone ahead of the heavy traffic zone where engine 111 mileage may be optimal and battery 132 usage is reduced. Once the second electric vehicle 200 arrives at the high traffic zone, the controller 150 of the second electric vehicle 200 may generate another adjustment command, or the initial adjustment command may include instructions to cause the second electric vehicle 200 (e.g., the motor 113 thereof) to be operated on the battery 132 in the high traffic zone. This may provide better efficiency in stop/start situations which is generally the case in high traffic zones. In this manner, the second electric vehicle 200 manages the state of charge of the battery 132 thereof based on the set of first operating parameters.

In some embodiments, the controller 150 of the second electric vehicle 200 may be configured to estimate a set of second operating parameters based on the set of first operating parameters. The controller 150 may then adjust the component operating parameter of at least one component of the second electric vehicle 200 based on the set of second operating parameters. In this manner, the controller 150 may proactively chart the operation of the second electric vehicle 200 so as to reduce battery consumption, increase mileage and/or reduce emissions.

In various embodiments, the controller 150 may be structured to monitor the battery 132 of the second electric vehicle 200, for example, via the charge system 134. The set of first operating parameters indicating expected weights and/or loads that the second electric vehicle 200 may likely need to transport at a later time. The controller 150 of the second electric vehicle 200 may then determine whether to adjust operation of a component (e.g., to manage the state of charge of the battery 132) of the second electric vehicle 200. In some examples, the determined expected weights and/or loads that the second electric vehicle 200 (e.g., an outbound bus) may likely need to transport at a later time may be used to estimate the weight, load, and/or the HVAC needs of one or more electric vehicles (e.g., one or more outbound PHEV buses). For example, the first electric vehicle 100 may include an inbound bus (e.g., traveling from a suburb into a city) and the first operating parameters may include ridership data (e.g., number of passengers traveling inbound), weight data and or heat load data of the first electric vehicle 100. The second electric vehicle 200 may include an outbound bus (e.g., traveling from the city to the suburb), and the controller 150 of the second electric vehicle 200 may proactively adjust operation of a component (e.g., to manage the state of charge of the battery 132) of the second electric vehicle 200 based on the first operating parameters of the first electric vehicle 100.

In examples wherein the charge station data is included in the one or more parameters transmitted, the charge station data may indicate that the charge station status is in an inoperable state (e.g., a non-functioning state). In such examples, the component management circuit 234 may determine that the state of charge of the battery 132 needs to be conserved until the next charging station. Alternatively or additionally, the component management circuit 234 may determine that the state of charge of the battery 132 needs to be charged by one or more components (e.g., by the engine of a range-extender electric vehicle) or any other suitable device, system, or component structured to charge the battery 132.

In examples wherein the charge station data indicates that there is heavy traffic at, near, within a predetermined distance of a location, or along a route of the second electric vehicle 200, the controller 150 may determine that the state of charge of the battery 132 needs to be conserved. Utilizing the data provided based on the operating parameters to plan the state of charge depletion and charging over the shift of operation for the second electric vehicle 200 (e.g., a PHEV bus operating in an outbound direction), advantageously manages the state of charge of the second electric vehicle 200.

In response to receiving the one or more parameters (e.g., the number of passengers currently riding in the in-bound direction), the controller 150 may determine the expected weights and/or loads that the second electric vehicle 200 (e.g., the second electric vehicle) may likely need to transport at a later time (e.g., later in the day, the afternoon, morning, and/or evening). The controller 150 may generate the adjustment command configured to adjust operation of the component responsive to the determination of whether to adjust operation of a component of a second electric vehicle 200 based on the one or more parameters. For example, the component may move between a current operation state and an adjusted operation state. In the current operation state, the component may be enabled (e.g., powered-on), disabled (e.g., powered-off), and/or performing at a certain performance level (e.g., the component may be outputting, utilizing, or storing energy at a certain level). In the adjusted operation state, the operation state of the component may be adjusted to a state (e.g., a different state) other than its current operation state. The adjustment of operation may be structured to manage a state of charge of the battery 132 associated with the second electric vehicle 200. In some embodiments, the command generated may cause movement of a component (e.g., the battery 132) to operate between the current operation state (e.g., non-charging state) and an adjusted operation state (e.g., a charging state). In this regard, the command may be structured to cause the battery 132 to charge responsive to the adjustment of the operation of the component.

In examples wherein the component management circuit 234 determined that the state of charge of the battery 132 needs to be conserved (e.g., when there is heavy traffic along the route of electric vehicle 100), the component management circuit 234 may generate a command structured to adjust operation of the engine 111, for example, by running the engine 111 more and/or causing the engine 111 to operate at a determined power amount between a current operation state (e.g., from the disabled or powered-off state) to an adjusted operation state (e.g., to an enabled or powered-on state) to enable the second electric vehicle 200 to run or utilize the battery 132 later during the heavy traffic areas to avoid stop-start events of the engine 111. In some examples, the command may be further structured to cause the motor 113 to operate according to a determined torque amount. For example, the command may be further structured to cause the motor 113 to operate between a current operation state (e.g., from the disabled or powered-off state) and an adjusted operation state (e.g., to an enabled or powered-on state) such that the output of the torque amount may increase or decrease. Furthermore, the battery 132 may be configured to charge responsive to the adjustment of the component operating parameter.

Figure 3:
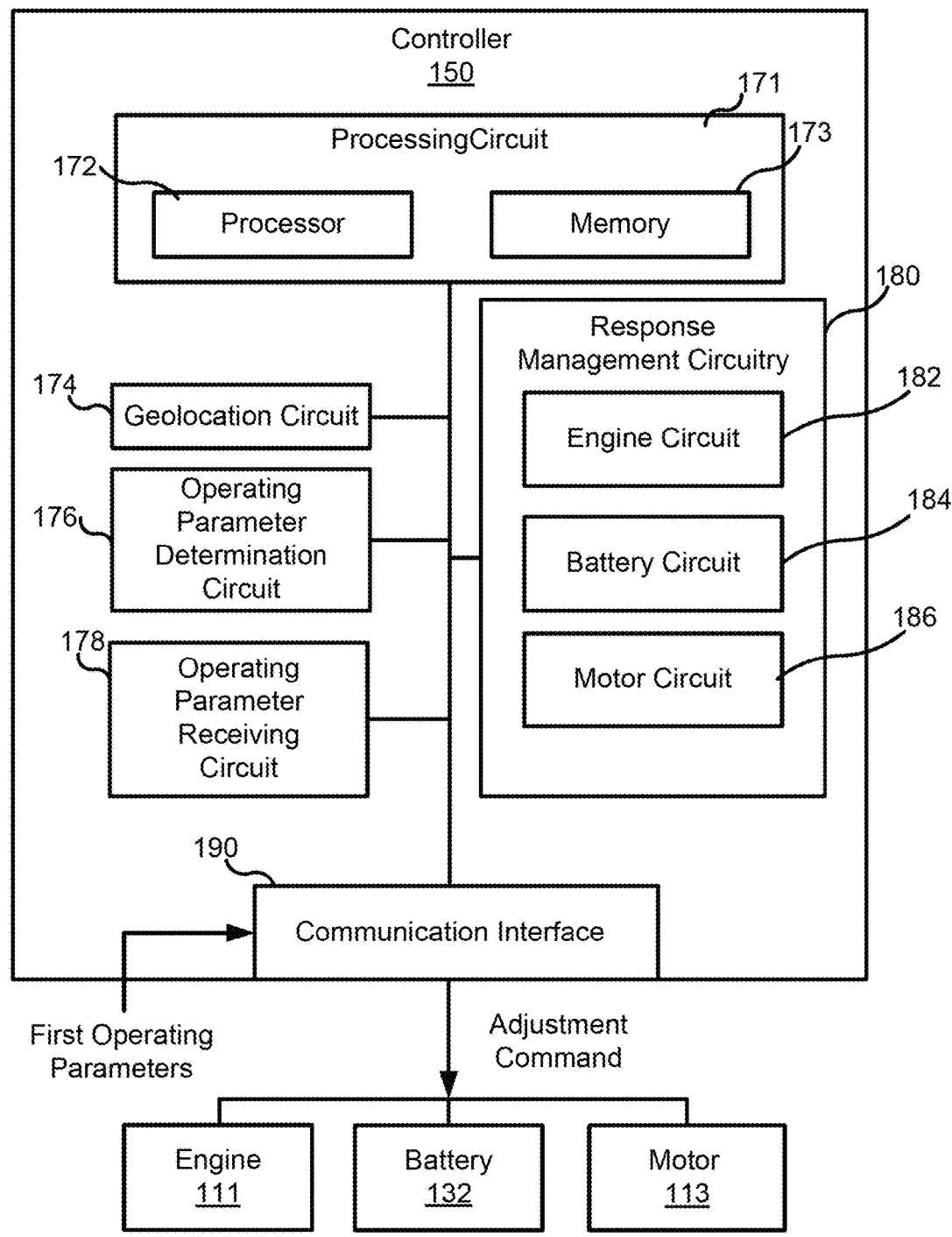
FIG. 3 is a schematic block diagram of the controller of FIG. 1, according to a particular embodiment.

In various embodiments, the controller 150 included in the electric vehicles 100, 200 may comprise an electronic control unit configured to receive various signals from components of the electric vehicles 100, 200 and communicate instructions thereto for controlling the engine 111 (e.g., engine speed or torque), battery 132 state of charge, and/or powertrain load (e.g., transmission 112 and/or motor 113) thereof for reducing battery 132 consumption and increasing range. As shown in FIG. 3, the controller 150 includes a processing circuit 171 having a processor 172 and a memory 173, a geolocation circuit 174, an operating parameter determination circuit 176, an operating parameter receiving circuit 178, and a communication interface 190. The controller 150 also includes a response management circuitry 180 having an engine circuit 182, a battery circuit 184, and a motor circuit 186.

The processor 172 may comprise a microprocessor, programmable logic controller (PLC) chip, an ASIC chip, or any other suitable processor. The processor 172 is in communication with the memory 173 and configured to execute instructions, algorithms, commands, or otherwise programs stored in the memory 173. The memory 173 may comprise any of the memory and/or storage components discussed herein. For example, memory 173 may comprise a RAM and/or cache of processor 172. The memory 173 may also comprise one or more storage devices (e.g., hard drives, flash drives, computer readable media, etc.) either local or remote to the controller 150. The memory 173 is configured to store look up tables, algorithms, or instructions.

In one configuration, the geolocation circuit 174, the operating parameter determination circuit 176, the operating parameter receiving circuit 178, and the response management circuitry 180 are embodied as machine or computer-readable media (e.g., stored in the memory 173) that is executable by a processor, such as the processor 172. As described herein and amongst other uses, the machine-readable media (e.g., the memory 173) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration the geolocation circuit 174, the operating parameter determination circuit 176, the operating parameter receiving circuit 178, and the response management circuitry 180 are embodied as hardware units, such as electronic control units. As such, the geolocation circuit 174, the operating parameter determination circuit 176, the operating parameter receiving circuit 178, and the response management circuitry 180 may be embodied as one or more circuitry components including, but not limited to, processing circuitry, network interfaces, peripheral devices, input devices, output devices, sensors, etc. In some embodiments, the geolocation circuit 174, the operating parameter determination circuit 176, the operating parameter receiving circuit 178, and the response management circuitry 180 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the geolocation circuit 174, the operating parameter determination circuit 176, the operating parameter receiving circuit 178, and the response management circuitry 180 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the geolocation circuit 174, the operating parameter determination circuit 176, the operating parameter receiving circuit 178, and the response management circuitry 180 may also include programmable hardware devices such as field programmable gate arrays, programmable array logic, programmable logic devices or the like. In this regard the geolocation circuit 174, the operating parameter determination circuit 176, the operating parameter receiving circuit 178, and the response management circuitry 180 may include one or more memory devices for storing instructions that are executable by the processor(s) of the geolocation circuit 174, the operating parameter determination circuit 176, the operating parameter receiving circuit 178, and the response management circuitry 180. The one or more memory devices and processor(s) may have the same definition as provided below with respect to the memory 173 and the processor 172.

In the example shown, the controller 150 includes the processing circuit 171 having the processor 172 and the memory 173. The processing circuit 171 may be structured or configured to execute or implement the instructions, commands, and/or control processes described herein with respect the geolocation circuit 174, the operating parameter determination circuit 176, the operating parameter receiving circuit 178, and the response management circuitry 180. Thus, the depicted configuration represents the aforementioned arrangement where the geolocation circuit 174, the operating parameter determination circuit 176, the operating parameter receiving circuit 178, and the response management circuitry 180 are embodied as machine or computer-readable media. However, as mentioned above, this illustration is not meant to be limiting as the present disclosure contemplates other embodiments such as the aforementioned embodiment where the geolocation circuit 174, the operating parameter determination circuit 176, the operating parameter receiving circuit 178, and the response management circuitry 180, or at least one circuit of the geolocation circuit 174, the operating parameter determination circuit 176, the operating parameter receiving circuit 178, and the response management circuitry 180 are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the geolocation circuit 174, the operating parameter determination circuit 176, the operating parameter receiving circuit 178, and the response management circuitry 180 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 173 (e.g., RAM, ROM, Flash Memory, hard disk storage, etc.) may store data and/or computer code for facilitating the various processes described herein. The memory 173 may be communicably connected to the processor 172 to provide computer code or instructions to the processor 172 for executing at least some of the processes described herein. Moreover, the memory 173 may be or include tangible, non-transient volatile memory or non-volatile memory. Accordingly, the memory 173 may include database components, object code components, script components, or any other type of information structure for supporting the various activities and information structures described herein.

The communication interface 190 may include wireless interfaces (e.g., jacks, antennas, transmitters, receivers, transceivers, wire terminals, etc.) for conducting data communications with various systems, devices, or networks. For example, the communication interface 190 may include an Ethernet card and port for sending and receiving data via an Ethernet-based communications network and/or a Wi-Fi transceiver for communicating with the controllers 150 of the corresponding electric vehicle 100, 200. The communication interface 190 may be structured to communicate via local area networks or wide area networks (e.g., the Internet, etc.) and may use a variety of communications protocols (e.g., IP, LON, Bluetooth, ZigBee, radio, cellular, near field communication, etc.).

The geolocation circuit 174 is structured to receive geolocation data indicative of the geolocation of the electric vehicles 100, 200 (e.g., physical location of the first electric vehicle 100 and/or the second electric vehicle 200 on the route). The geolocation circuit 174 may thereby facilitate determining the current geolocation of each of the first electric vehicle 100 and the second electric vehicle 200 on the route. The geolocation data may be received in real time such that the controller 150 continuously or sequentially determines and updates the geolocation of the electric vehicles 100, 200. For example, the geolocation circuit 174 may be included in the controller 150 of the first electric vehicle 100 and associate location data, to the set of first operating parameters (e.g., traffic data, ridership data, charge station data, time of day data, day of week data, time of operation relative to daily mission data, route schedule data, vehicle weight, and ambient conditions) encountered by the first electric vehicle 100 on the route. Furthermore, the controller 150 of the second electric vehicle 200 may also include the geolocation circuit 174, which may be configured to determine a location of the second electric vehicle 200 on the route. The controller 150 may use the set of first operating parameters obtained from the first electric vehicle 100 corresponding to a location for adjusting one or more component operating parameters thereof when the second electric vehicle 200 arrives at the location.

The operating parameter determination circuit 176 is configured to determine the set of first operating parameters (e.g., traffic data, ridership data, charge station data, time of day data, day of week data, time of operation relative to daily mission data, route schedule data, vehicle weight, and ambient conditions). For example, the operating parameter determination circuit 176 may receive various signals from the sensors 123 (e.g., cameras, temperature sensors, charger status determination sensors, etc.), the geolocation circuit 174 and/or the external notification system 20 so as to determine the set of first operating parameters.

The operating parameter receiving circuit 178 is configured to receive the set of first operating parameters from the controller 150 of the first electric vehicle 100 (e.g., the leading electric vehicle), which may be used to adjust a component operating parameter of at least one component of the second electric vehicle 200 (e.g., the following electric vehicle) based on the set of first operating parameters. The operating parameter receiving circuit 178 may determine whether to adjust a component operating parameter of at least one component of the second electric vehicle 200, for example, an engine torque, a motor torque, a power draw on the battery 132 and/or load distribution between engine 111 and the battery 132.

For example, each of the first electric vehicle 100 and the second electric vehicle 200 may include the operating parameter determination circuit 176 and the operating parameter receiving circuit 178. When the first electric vehicle 100 is the leading vehicle, the operating parameter determination circuit 176 of the controller 150 of the first electric vehicle 100 may determine the set of first operating parameters. The second electric vehicle 200 may follow the first electric vehicle 100, and the operating parameter receiving circuit 178 of the controller 150 of the second electric vehicle receives the set of first operating parameters from the controller 150 of the first electric vehicle 100 (e.g., via the communication network 160).

In other instances the second electric vehicle 200 may be the leading electric vehicle. In such instances, the operating parameter determination circuit 176 of the controller 150 of the second electric vehicle 200 may determine the set of first operating parameters. The first electric vehicle 100, or a third electric vehicle which may be substantially similar to the first electric vehicle 100 and the second electric vehicle 200, may follow the second electric vehicle 200 on the route. The operating parameter determination circuit 176 of the controller 150 of the first electric vehicle 100 or the third electric vehicle may receive the set of first operating parameters from the controller 150 of the second electric vehicle 200 (e.g., via the communication network 160).

In particular embodiments, the operating parameter receiving circuit 178 may also be configured to estimate a set of second operating parameters based on the set of first operating parameters. The set of second operating parameters may correspond to expected operating parameters which the following electric vehicle (e.g., the second electric vehicle 200) is expected to encounter on the route. In some embodiments, the operating parameter receiving circuit 178 may be configured to estimate the set of second operating parameters by adjusting the set of first operating parameters based on real time information or heuristic data. For example, the second electric vehicle 200 may be expected to travel through a location where rush hour will commence after the first electric vehicle 100 has already gone through the location, an accident occurred after the first electric vehicle 100 departed from the location (e.g., based on information received from the external notification system 20), or any other information not included in the set of first operating parameters. The set of first operating parameters may be adjusted to account for such anticipated changes so as to estimate the set of second operating parameters.

The response management circuitry 180 is configured to generate an adjustment command configured to adjust a component operating parameter of at least one component (e.g., the engine 111, the motor 113 and/or the battery 132) of the second electric vehicle 200 based on the determination by the operating parameter receiving circuit 178. In particular embodiments, the adjustment command may be configured to adjust the one or more component operating parameters based on the set of second operating parameters. The adjustment of the one or more component operating parameters is configured to manage a state of charge of the battery 132 associated with the second electric vehicle 200 (or otherwise, the following electric vehicle).

Expanding further, the response management circuitry 180 includes an engine circuit 182, a battery circuit 184, and a motor circuit 186. The engine circuit 182 may be configured to generate an engine adjustment command configured to cause the engine 111 to operate according to a determined power amount (e.g., operate at a determined speed or torque). The engine circuit 182 may generate the engine adjustment command which may be configured to, for example, activate the engine 111, and/or increase the speed of the engine 111 when the battery 132 is to be conserved (e.g., driving in low traffic at high speeds, when battery charge is low, weight and load on the second electric vehicle 200 are high, and/or a charge station on the route is not operational).

The battery circuit 184 may be configured to generate a battery adjustment command configured to cause the battery 132 to conserve a charge thereof, or allow power draw therefrom. For example, the battery adjustment command may cause the battery 132 provide power to the motor 113 during heavy traffic conditions, so as to increase mileage, but stop power draw therefrom in low traffic conditions, when battery charge is low and/or a charge station on the route is not operational.

The motor circuit 186 is configured to generate a motor adjustment command configured to cause the motor 113 to operate according to a predetermined torque amount. For example, the motor adjustment command may exert a higher torque and therefore, demand higher power from the battery 132 in heavy traffic conditions, or weight and/or heat load on the second electric vehicle 200 is high, but reduce a torque thereof so as to lower a power draw on the battery 132, for example, when the battery charge of the battery 132 is low.

FIG. 4 is a schematic flow diagram of an example method 400 for a vehicle management system (e.g., the vehicle management system 10) structured to manage a state of charge of the battery 132 of a following electric vehicle (e.g., the second electric vehicle 200) on a route via the circuitry described herein with reference to FIGS. 1-3. While described with respect to the first electric vehicle 100, the second electric vehicle 200 and the controller 150, the operations of the method 400 may be used with any other electric vehicle (e.g., hybrid electric vehicles (HEV), plug-in hybrid electric vehicles (PHEV), or range extender electric vehicles (REEV)) operating on the same or similar routes.

At 402, the method 400 includes receiving a set of first operating parameters (e.g., traffic data, ridership data, charge station data, time of day data, day of week data, time of operation relative to daily mission data, route schedule data, vehicle weight, ambient conditions, etc.) associated with a first electric vehicle (e.g., the first electric vehicle 100). For example, the operating parameter receiving circuit 178 included in the controller 150 of the second electric vehicle 200 may receive the set of first operating parameters from the controller 150 of the first electric vehicle 100. The first electric vehicle 100, the second electric vehicle 200, or any number of vehicles operating on the route as described herein, may include, but are not limited to, a hybrid electric vehicle (HEV), plug-in hybrid electric vehicle (PHEV), or range extender electric vehicle (REEV). The electric vehicles 100, 200 may operate according to a fixed route or a non-fixed route. For example, a suburban district may run one or more electric vehicles (e.g., one or more PHEV buses) according to a fixed route. The fixed route may run three times in the morning at slightly different times picking up different age children, for example, to transport them to one or more destinations (e.g., to elementary school, middle school, and high school). The fixed route may be reversed, for example, later in the day (e.g., in the evening) at different times. In some examples, some electric vehicles (e.g., a taxi or other passenger transportation service) may operate according to a non-fixed route (e.g., a route that is not based on a predetermined schedule or a plurality of fixed locations or destinations). For example, one or more taxis may be going to a sporting event at a stadium or convention center and then leaving from there later in the evening to drop a passenger off at another location.

The controller 150 may be further structured to transmit the one or more parameters (e.g., traffic data, ridership data, charge station data) from the first electric vehicle 100 to the second electric vehicle 200, or between a plurality of electric vehicles. The plurality of electric vehicles may include, for example, a plurality of PHEV buses running the same route. For example, during an hour long route four buses may pick up passengers from a location every 15 minutes. The electric vehicles (e.g., the first electric vehicle 100 and the second electric vehicle 200) may communicate, via the communication network 160, an over air transfer, the Internet, any type of network as described herein, with each other to exchange the one or more parameters (e.g., current data associated with traffic data, ridership data, charge station data) to be used in managing each respective electric vehicle 100 (e.g., to manage the state of charge of the battery 132 coupled to each respective PHEV bus). For examples, the one or more parameters associated with a first electric vehicle 100 (e.g., a first PHEV bus) may be transmitted to a controller 150 associated with the second electric vehicle 200 (e.g., a second PHEV bus). Alternatively or additionally, the one or more parameters (e.g., traffic data, charge station data, etc.) associated with a first electric vehicle may be transmitted to a control system communicatively coupled (e.g., via an over air transfer) to the geolocation circuit 174 (e.g., a telematics system, GPS, location positioning system, etc.) included in the controller 150 associated with the second electric vehicle 200 (e.g., a second PHEV bus).

The charge station data may include a current charge station status, a previous charge station status, or a combination thereof. The charge station data may be associated with a location of at least one of the first electric vehicle 100 or the second electric vehicle 200. For example, the controller 150 associated with the first electric vehicle 100 (e.g., a departing PHEV bus) may transmit or otherwise communicate the history and/or the status of a charge station along a route to the controller 150 associated with the second electric vehicle 200 (e.g., the next arriving PHEV bus). In some examples, the controller 150 associated with the first electric vehicle 100 (e.g., a departing PHEV bus) may transmit, exchange, or otherwise communicate the status of the traffic (e.g., an increase stop-start event if vehicle is running in load sharing mode between the engine 111 and the battery 132) at or near a charge station along a route to the controller 150 associated with the second electric vehicle 200 (e.g., the next arriving PHEV bus). The controller 150 of the first electric vehicle 100 running the same route, for example, a few minutes earlier may transmit the one or more parameters in real-time or near real-time such that the first electric vehicle 100 (e.g., the departing PHEV bus) may communicate the current data corresponding to the set of first operating parameters to the second electric vehicle 200 (e.g., the next arriving PHEV bus) in real-time or near real-time.

To that end, the plurality of electric vehicles may exchange data such as, but not limited to, current traffic conditions, the number of passengers currently riding each respective electric vehicle, and history of a charge station, status of a charge station, etc. In further examples, the first electric vehicle 100 (e.g., a departing PHEV bus) may transmit, exchange, or otherwise communicate the number of passengers currently riding in the in-bound direction to the second electric vehicle 200 (e.g., the next arriving PHEV bus). In other examples, the first electric vehicle 100 (e.g., one or more inbound PHEV buses) may track the number of passengers transported to a location, an area (e.g., into a city), or other destination before a certain time. In response to receiving the one or more parameters (e.g., the number of passengers currently riding in the in-bound direction), the operating parameter receiving circuit 178 may then determine the expected weights and/or loads that the second electric vehicle 200 (e.g., the outbound buses) may likely need to transport at a later time (e.g., later in the day, the afternoon, morning, and/or evening).

At 404, the method 400 determines whether to adjust a component operating parameters of at least one component of second electric vehicle, which follows the first electric vehicle 100 on a route, based on the set of first operating parameters. For example, the operating parameter receiving circuit 178 of the second electric vehicle 200 may be configured determine whether to adjust the operation of a component of the second electric vehicle 200 based on the set of first operating parameters. The component may include the motor 113, the battery 132, the engine 111, and/or any other component or system of the second electric vehicle 200. In some examples, the controller 150 may be structured to monitor the battery 132 of the second electric vehicle 200. Accordingly, in response to receiving, the determined expected weights and/or loads that the second electric vehicle 200 (e.g., an outbound PHEV bus) may likely need to transport at a later time, the operating parameter receiving circuit 178 may then determine whether to adjust operation of a component (e.g., to manage the state of charge of the battery 132) of a second electric vehicle 200. In some examples, the determined expected weights and/or loads that the second electric vehicle 200 (e.g., an outbound PHEV bus) may likely need to transport at a later time may be used to estimate the weight, load, and/or the HVAC needs of one or more electric vehicles (e.g., one or more outbound PHEV buses). In examples where the charge station data is included in the one or more parameters transmitted, the charge station data may indicate that the charge station status is in an inoperable state (e.g., a non-functioning state). In such examples, the operating parameter receiving circuit 178 may determine that the state of charge of the battery 132 needs to be conserved until the next charging station. Alternatively or additionally, the operating parameter receiving circuit 178 may determine that the state of charge of the battery 132 needs to be charged by one or more components (e.g., by the engine of a range-extender electric vehicle) or any other suitable device, system, or component structured to charge the battery 132.

In examples where the charge station data indicates that there is heavy traffic at, near, within a predetermined distance of a location, or along a route of the second electric vehicle 200 based on the set of first operating parameters, the operating parameter receiving circuit 178 may determine that the state of charge of the battery 132 needs to be conserved. Utilizing the data provided based on the set of first operating parameters to plan the state of charge depletion and charging over the shift of operation for the second electric vehicle 200 (e.g., a PHEV bus operating in an outbound direction) which follows the first electric vehicle 100, advantageously manages the state of charge of the second electric vehicle 200.

At 406, the method 400 includes generating an adjustment command configured to adjust a component operating parameter of at least one component associated with the second electric vehicle in response to the determination, so as to manage a state of charge of the battery 132 associated with the second electric vehicle. For example, the response management circuitry 180 (e.g., one or more of the engine circuit 182, the battery circuit 184 and the motor circuit 186) may be configured to generate the adjustment command so as to adjust a component operating parameter of the engine 111, the battery 132 and/or the motor 113 as previously described herein. The adjustment command is configured to manage a state of charge of the battery 132 associated with the second electric vehicle 200.

For example, the component may move between a current operation state and an adjusted operation state. In the current operation state, the component may be enabled (e.g., powered-on), disabled (e.g., powered-off), and/or performing at a certain performance level (e.g., the component may be outputting, utilizing, or storing energy at a certain level). In the adjusted operation state, the operation state of the component may be adjusted to a state (e.g., a different state) other than its current operation state. The adjustment of operation may be structured to manage a state of charge of the battery 132 associated with the second electric vehicle 200. In some examples, the adjustment command may cause movement of a component (e.g., the battery 132) to operate between the current operation state (e.g., non-charging state) and an adjusted operation state (e.g., a charging state). In this regard, the adjustment command may be configured to cause the battery 132 to charge responsive to the adjustment of the operation of the component. In examples in which the operating parameter receiving circuit 178 determined that the state of charge of the battery 132 needs to be conserved (e.g., when there is heavy traffic along the route of the first electric vehicle 100), the operating parameter receiving circuit 178 may generate a command structured to adjust operation of the engine 111 (e.g., by running the engine 111 more and/or causing the engine 111 to operate at a determined power amount) between a current operation state (e.g., from the disabled or powered-off state) to an adjusted operation state (e.g., to an enabled or powered-on state) to enable the second electric vehicle 200 to run or utilize the battery 132 later during the heavy traffic areas to avoid stop-start events of the engine 111. In some examples, the adjustment command may be further configured to cause the motor 113 to operate according to a determined torque amount. For example, the adjustment command may be further structured to cause the motor 113 to operate between a current operation state (e.g., from the disabled or powered-off state) and an adjusted operation state (e.g., to an enabled or powered-on state) such that the output of the torque amount may increase or decrease.

FIG. 5 is a schematic flow diagram of another example method 500 for managing a state of charge of a battery (e.g., the battery 132) included in a following electric vehicle (e.g., the second electric vehicle 200) which follows a leading electric vehicle (e.g., the first electric vehicle 100) on a route, according to an embodiment. The method includes determining a set of first operating parameters associated with a first electric vehicle traveling on the route, at 502. For example, the operating parameter determination circuit 176 included in the controller 150 of the first electric vehicle 100 may determine the set of first operating parameters (e.g., traffic data, ridership data, charge station data, time of day data, day of week data, time of operation relative to daily mission data, route schedule data, vehicle weight and/or ambient conditions) which the first electric vehicle 100 encounters on the route, as previously described herein.

At 504, a second electric vehicle following the first electric vehicle receives the set of first operating parameters. For example, the operating parameter receiving circuit 178 included in the controller 150 of the second electric vehicle 200 may receive the set of first operating parameters from the first electric vehicle 100 via the communication network 160, as previously described herein. In some embodiments, the second electric vehicle may follow the first electric vehicle on the same or substantially the same route after a predetermined time (e.g., 5, 10, 15, 20, 25, 30 minutes or any other predetermined time after the first electric vehicle). In other embodiments, the second electric vehicle may run a reverse route to the first electric vehicle. For example, the first electric vehicle may include an inbound bus traveling in the morning, and the second electric vehicle may include an outbound bus traveling in the evening.

At 506, a set of second operating parameters are estimated based on the set of first operating parameters. For example, the operating parameter receiving circuit 178 may determine the set of second operating parameters based on the set of first operating parameters, as previously described herein. At 508, a component operating parameter of at least one component of the second electric vehicle is adjusted based on the set of second operating parameters. For example, the response management circuitry 180 (e.g., the engine circuit 182, the battery circuit 184 and/or the motor circuit 186) may generate an adjustment command configured to adjust a component operating parameter (e.g., an engine speed, an engine torque, a motor speed, a motor torque and/or a battery usage) of the at least one component (e.g., the engine 111, the motor 113 and/or the battery 132) of the second electric vehicle 200. In this manner, a state of charge of the battery 132 of the second electric vehicle 200 or any other electric vehicle following the first electric vehicle 100 on the route may be managed.

Although an example controller 150 has been described in FIG. 3, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions) encoded on one or more computer storage media for execution by, or to control the operation of, data processing apparatus. A computer storage medium comprises a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer, on multiple computers that are located at one site, or distributed across multiple sites and interconnected by a communication network.

Processors suitable for the execution of a computer program comprise, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also comprise, or be operatively coupled to receive data from or transfer data to, or both, one or more mass storage devices for storing data (e.g., magnetic, magneto-optical disks, or optical disks). However, a computer need not have such devices. Devices suitable for storing computer program instructions and data comprise all forms of non-volatile memory, media and memory devices, including, by way of example, semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The invention claimed is:

1. A system for communication between a first electric vehicle and a second electric vehicle following the first electric vehicle on a route, the system comprising:
   a controller configured to:
      acquire a set of operating parameters associated with the first electric vehicle from the first electric vehicle, the set of operating parameters including charge station data indicating whether a charge station along the route is unavailable for use; and
      generate an adjustment command configured to adjust a component operating parameter of at least one component of the second electric vehicle based on the set of operating parameters;
      wherein the at least one component includes an engine, a battery, or an electric motor.

2. The system of claim 1, wherein the set of operating parameters are acquired without the second electric vehicle requesting the set of operating parameters from the first electric vehicle.

3. The system of claim 1, wherein the at least one component includes the battery, and wherein adjusting the component operating parameter facilitates managing a state of charge of the battery of the second electric vehicle by increasing operation of the engine of the second electric vehicle in response to the charge station data indicating that the charge station along the route is unavailable for use.

4. The system of claim 1, wherein the set of operating parameters includes the charge station data and at least one of (a) ridership data regarding a number of passengers traveling on the first electric vehicle or (b) traffic data associated with the first electric vehicle.

5. The system of claim 4, wherein the set of operating parameters includes the charge station data, the ridership data, and the traffic data.

6. The system of claim 4, wherein the set of operating parameters includes the charge station data and the ridership data.

7. The system of claim 4, wherein the set of operating parameters includes the charge station data and the traffic data.

8. The system of claim 7, wherein the component operating parameter includes a state of a charge of the battery, and wherein the adjustment command is configured to manage the state of charge of the battery such that the state of charge of the battery is (a) maintained at or above a predefined level in advance of the second electric vehicle encountering traffic indicated by the traffic data and (b) depleted when the second electric vehicle encounters the traffic indicated by the traffic data.

9. The system of claim 8, wherein the adjustment command is configured to cause the battery to be charged in advance of the second electric vehicle encountering the traffic indicated by the traffic data.

10. The system of claim 1, wherein each of the first electric vehicle and the second electric vehicle is one or a hybrid electric vehicle, a plug-in hybrid electric vehicle, a battery electric vehicle, or a range extender electric vehicle.

11. The system of claim 1, wherein the route is a predetermined, fixed route.

12. A system for communication between a first electric vehicle and a second electric vehicle following the first electric vehicle on a route, the system comprising:
a controller configured to:
acquire a set of operating parameters associated with the first electric vehicle from the first electric vehicle, the set of operating parameters including (a) charge station data and (b) at least one of traffic data or ridership data; and
generate an adjustment command configured to adjust a component operating parameter of at least one component of the second electric vehicle based on the set of operating parameters, wherein the component operating parameter includes a state of a charge of a battery of the second electric vehicle; and
wherein the adjustment command is configured to manage the state of charge of the battery of the second electric vehicle such that the state of charge of the battery is (a) maintained at or above a predefined level in advance of the second electric vehicle encountering traffic indicated by the traffic data and (b) depleted when the second electric vehicle encounters the traffic indicated by the traffic data.

13. The system of claim 12, wherein adjusting the component operating parameter facilitates managing the state of charge of a battery of the second electric vehicle by increasing operation of an engine of the second electric vehicle in response to the charge station data indicating that a charge station along the route is unavailable for use.

14. The system of claim 12, wherein the adjustment command is configured to cause the battery to be charged in advance of the second electric vehicle encountering the traffic indicated by the traffic data.

15. The system of claim 12, wherein the route is a predetermined, fixed route.

16. The system of claim 12, wherein the set of operating parameters include the charge station data, the traffic data, and the ridership data.

17. A non-transitory computer readable medium having computer-executable instructions stored therein, the instructions, when executed by one or more processors of a first electric vehicle, cause the one or more processors to perform operations comprising:
initiating communication with a second electric vehicle following the first electric vehicle on a predetermined, fixed route; and
transmitting charge station data from the first electric vehicle to the second electric vehicle indicating whether a charge station along the route is unavailable for use;
wherein the charge station data causes the second electric vehicle to adjust one or more component operating parameters thereof based on the charge station data indicating that the charge station is unavailable for use, wherein the one or more component includes an engine, a battery, or an electric motor.

18. The non-transitory computer readable medium of claim 17, wherein adjusting the one or more operating parameters facilitates managing a state of charge of a battery of the second electric vehicle by increasing operation of an engine of the second electric vehicle in response to the charge station data indicating that the charge station along the predetermined, fixed route is unavailable for use.

19. The non-transitory computer readable medium of claim 17, wherein the instructions, when executed by one or more processors, further cause the one or more processors to perform operations comprising:
acquiring traffic data associated with the first electric vehicle from the first electric vehicle; and
managing a state of charge of a battery of the second electric vehicle such that the state of charge of the battery is (a) maintained at or above a predefined level in advance of the second electric vehicle encountering traffic indicated by the traffic data and (b) depleted when the second electric vehicle encounters the traffic indicated by the traffic data.

\* \* \* \* \*